United States Patent
Jackson et al.

(10) Patent No.: US 7,063,787 B2
(45) Date of Patent: Jun. 20, 2006

(54) FILTER MEDIA RETAINING CAP AND HOLD DOWN GRID

(75) Inventors: Scott Jackson, Gilbert, IA (US); Darin St. Germain, Gilbert, IA (US); Thomas J. Steinke, Columbia Heights, MN (US); Paul M. Gallagher, Ames, IA (US)

(73) Assignee: USFilter Corporation, Warrendale, PA (US)

( * ) Notice: Subject to any disclaimer, the term of this patent is extended or adjusted under 35 U.S.C. 154(b) by 342 days.

(21) Appl. No.: 10/163,065

(22) Filed: Jun. 5, 2002

(65) Prior Publication Data

US 2003/0006183 A1 Jan. 9, 2003

Related U.S. Application Data

(60) Provisional application No. 60/296,331, filed on Jun. 6, 2001.

(51) Int. Cl.
*B01D 23/24* (2006.01)

(52) U.S. Cl. ............... 210/274; 210/275; 210/279; 210/292; 210/293; 210/793

(58) Field of Classification Search ............ 210/274, 210/275, 279, 293, 292, 793
See application file for complete search history.

(56) References Cited

U.S. PATENT DOCUMENTS

| | | | |
|---|---|---|---|
| 2,710,692 A | 6/1955 | Kegel et al. | |
| 2,716,490 A | 8/1955 | Barstow | |
| 3,840,117 A * | 10/1974 | Ross ................. | 210/794 |
| 4,065,391 A | 12/1977 | Farabaugh | |
| 4,133,766 A | 1/1979 | Adie | |
| 4,214,992 A | 7/1980 | Sasano et al. | |
| 4,222,876 A | 9/1980 | Englehart | |
| 4,331,542 A | 5/1982 | Emrie | |
| 4,364,830 A | 12/1982 | Roberts | |
| 4,564,450 A | 1/1986 | Piper et al. | |
| 4,619,765 A | 10/1986 | Roberts | |
| 4,750,999 A | 6/1988 | Roberts et al. | |
| 4,882,053 A | 11/1989 | Ferri | |
| 5,019,259 A | 5/1991 | Hambley | |
| 5,068,034 A | 11/1991 | Walter | |
| 5,087,358 A * | 2/1992 | Massignani ........... | 210/195.1 |
| 5,087,362 A | 2/1992 | Brown | |
| 5,089,147 A | 2/1992 | Ross | |
| 5,108,627 A | 4/1992 | Berkebile et al. | |
| 5,149,427 A | 9/1992 | Brown et al. | |
| 5,160,614 A | 11/1992 | Brown | |
| 5,202,022 A | 4/1993 | Ferri | |
| 5,232,592 A | 8/1993 | Brown et al. | |

(Continued)

FOREIGN PATENT DOCUMENTS

WO WO 97/40907 11/1997

(Continued)

OTHER PUBLICATIONS

Porex Technologies, Website, Date First Visited Aug. 9, 1999 (relevant pages attached); http://www.porex.com.

*Primary Examiner*—Minh-Chau T. Pham

(57) ABSTRACT

The invention recites a filtration tank including a chamber for holding liquid to be filtered, the filtration tank includes a fluid inlet for providing liquid to the chamber. The filtration tank further includes a fluid outlet and at least one filter block disposed between the inlet and the outlet, wherein the at least one filter block includes a porous cap having an average pore size of up to about 250 microns.

37 Claims, 6 Drawing Sheets

U.S. PATENT DOCUMENTS

| | | |
|---|---|---|
| 5,269,920 A | 12/1993 | Brown et al. |
| 5,328,608 A | 7/1994 | Bergmann et al. |
| 5,332,497 A | 7/1994 | Shea et al. |
| 5,413,710 A | 5/1995 | Roberts et al. |
| 5,489,388 A | 2/1996 | Brown et al. |
| 5,534,202 A | 7/1996 | Roberts et al. |
| 5,618,421 A | 4/1997 | Sorosinski |
| 5,639,384 A | 6/1997 | Brown et al. |
| 5,865,999 A | 2/1999 | Shea et al. |
| 2001/0032813 A1* | 10/2001 | Savage ........................ 210/274 |

FOREIGN PATENT DOCUMENTS

WO     WO 98/04332     2/1998

* cited by examiner

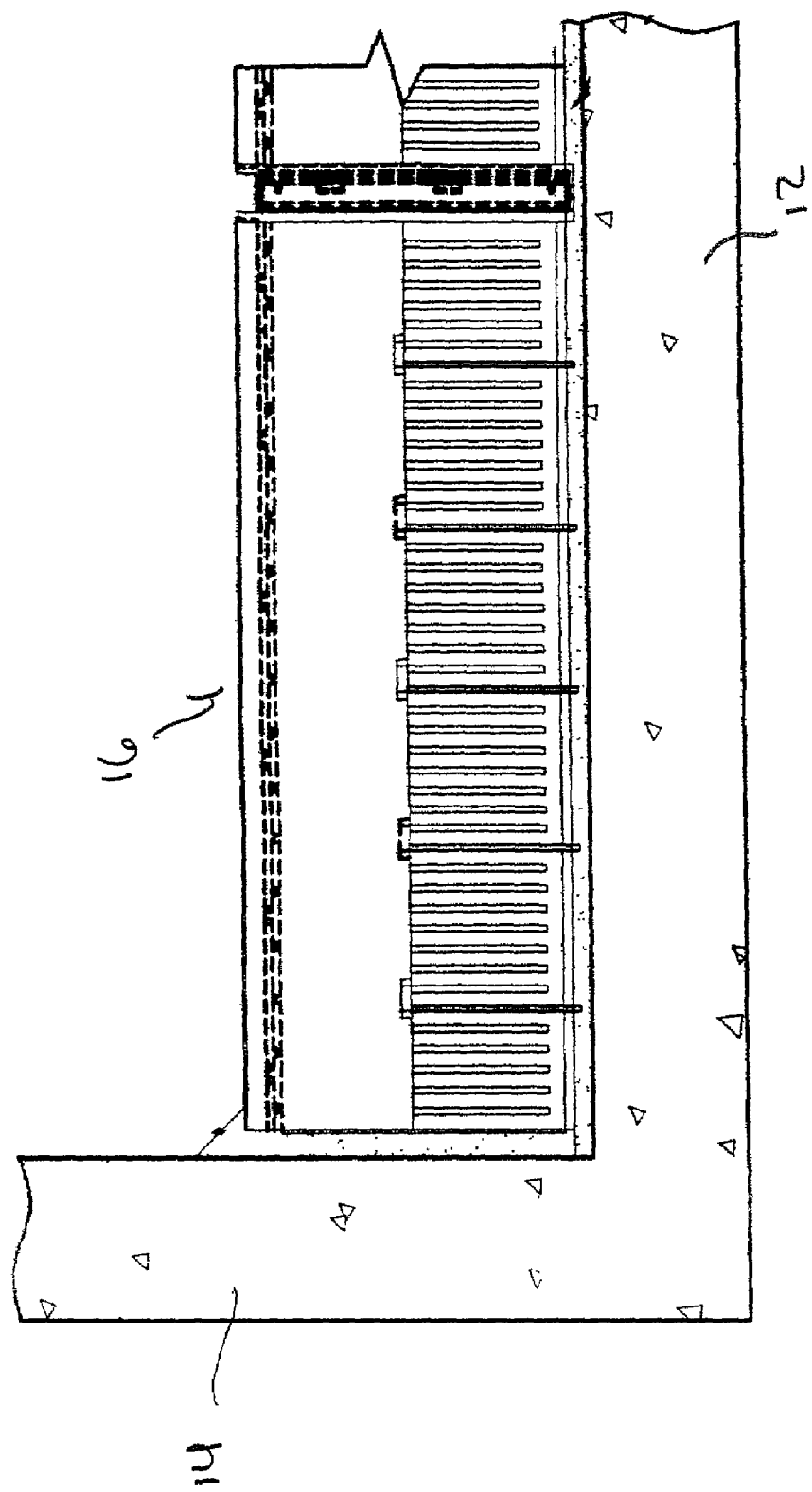

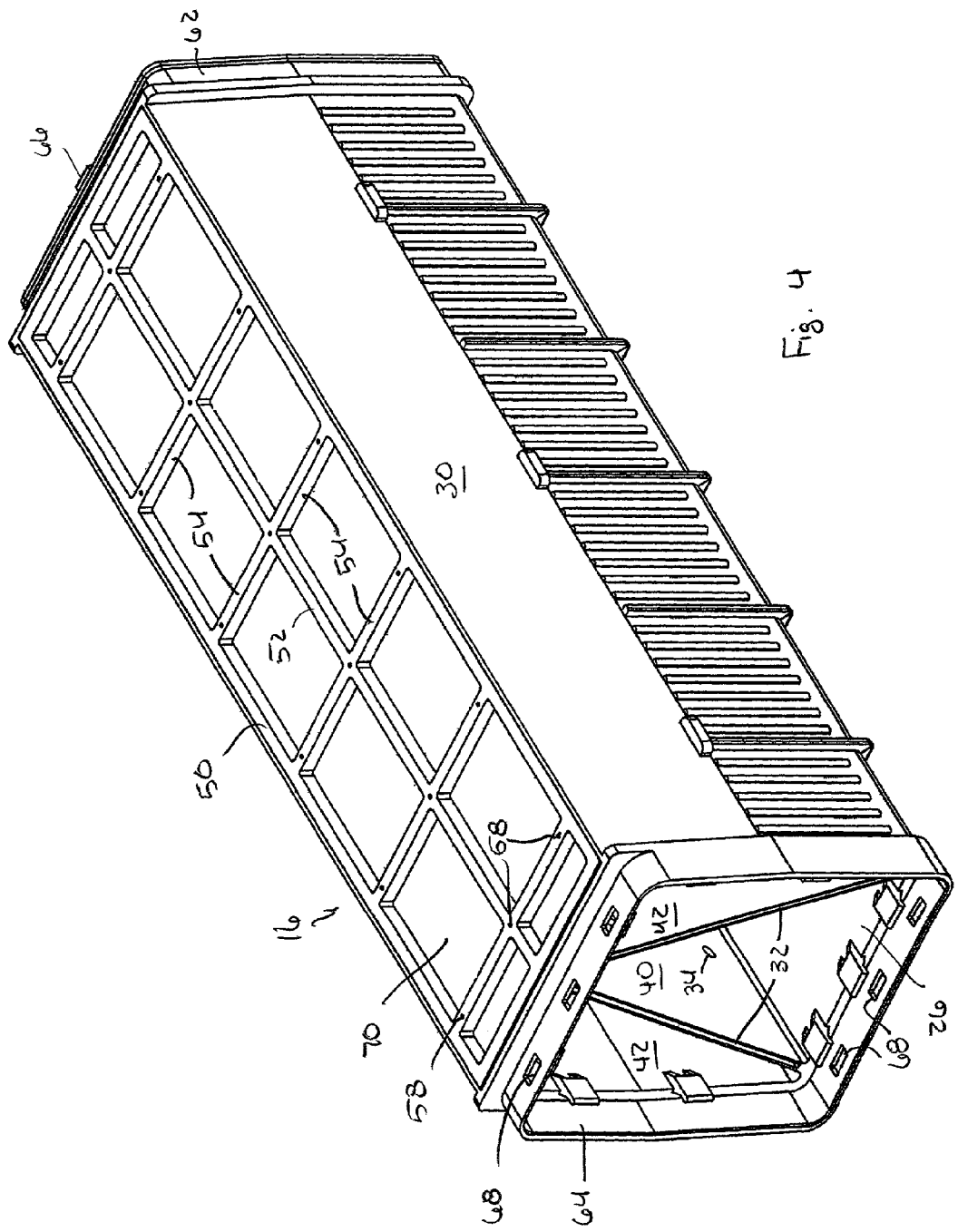

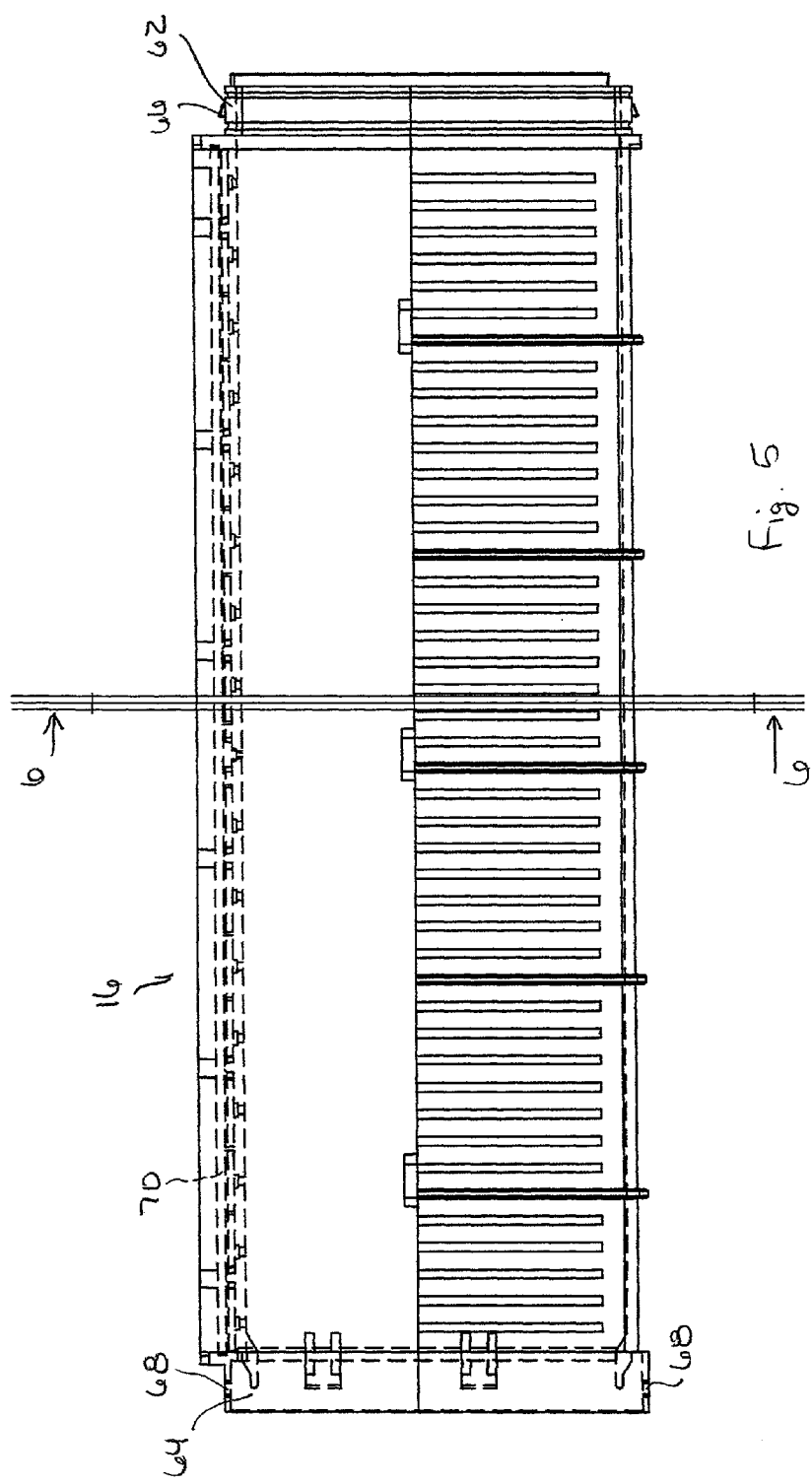

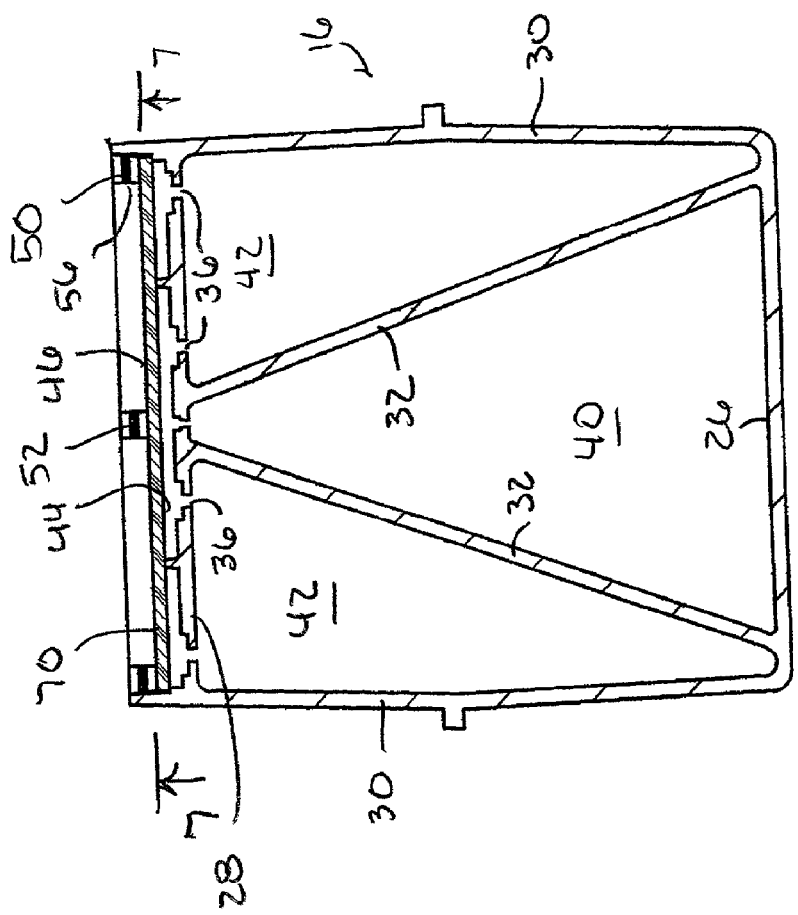

FILTER MEDIA RETAINING CAP AND HOLD DOWN GRID

RELATED APPLICATION DATA

This application claims benefit under 35 U.S.C. Section 119(e) of U.S. Provisional Application No. 60/296,331 filed Jun. 6, 2001.

BACKGROUND OF THE INVENTION

1. Field of the Invention

This invention relates to underdrains and gravity filters and, more particularly, to a filter media support system for underdrain blocks.

2. Description of Related Art

Granular media filtration units are typically used to filter water, wastewater and industrial fluids. Filtration units typically employ underdrain systems to collect filtrate, channel it away from the filter bed, and also to distribute backwash gases and fluids into the filter bed. Several underdrain assemblies for filter bottoms are known in the art. U.S. Pat. No. 4,619,765 to Roberts; U.S. Pat. No. 5,108,627 to Berkible; U.S. Pat. No. 5,328,608 to Bergmann and U.S. Pat. No. 5,489,388 to Brown describe known underdrain systems. A typical filter media bottom comprises a main flume with multiple parallel rows of filter blocks, also known as laterals, arranged perpendicularly to the main flume across the filter bottom. Filter media of varying particle size covers the filter bottom. Frequently a layer of gravel separates the filter media and the filter blocks to prevent the filter media from penetrating apertures in the top of the filter blocks.

Fluid to be filtered typically enters the filtration unit from above and flows down through the filter media by gravitational forces. The filtrate then flows into the block underdrains, through the main flume to the outlet. The filter media is typically cleansed at predetermined intervals by backwashing. During the backwash cycle, gas and/or liquid is directed through the main flume to the lateral underdrain blocks and upwardly through the filter media to loosen and remove contaminants collected by the filter media. The gravel support layer above the filter blocks may typically be up to 18 inches in height and contain several layers of varying size gravel. The gravel may be layered according to size in an hour glass configuration in which a fine size gravel layer is sandwiched between layers of progressively larger gravel sizes. The innermost fine size gravel layer prevents the filter media from penetrating the underdrain block, while the coarse size layer prevents plugging of the fine gravel layer. Gravel, however, may be difficult and costly to install and may require the use of deeper filter units. In addition, the hour-glass configuration of the gravel layers may be disturbed during backwash, necessitating restoration of the desired layered configuration. In other prior art arrangements, filter media retaining caps supported on the filter blocks may be used in conjunction with, or as a substitution for, the gravel support layer to block the media from entering the filter blocks. Several filter media retaining caps are known in the art.

U.S. Pat. No. 2,716,490 to Barstow discloses a means for securing porous plates to the supporting filter block so that they may be quickly and easily set and held in position to provide an integral porous partition between upper and lower chambers.

U.S. Pat. No. 4,882,053 to Ferri discloses a porous filter support plate of the kind used in traveling bridge filters for the support of granular filter media. The support plates are formed of porous, heat-fusible materials, for example, a thermoplastic organic material, joined together by heat fused butt joints and/or reinforced by vertical zones which extend vertically through the plates in which the material has been brought to a molten state and pressed together to form a dense, solid, nonporous mass.

U.S. Pat. No. 5,019,259 to Hambley discloses a filter underdrain apparatus comprising plate means and a screen arrangement which may be included to screen the liquid and gas orifices from filter media exterior of the distributor conduits. The screen may comprise perforated grids and may extend across the trough between adjacent distributor conduits.

U.S. Pat. No. 5,089,147 to Ross discloses a bed of granular medium such as sand supported on a screen within a filter tank cell. An underdrain structure supports the screen while a hold down grating secures the screen in place from above. The grating is held in place by adjustable hold down means secured to tank walls.

U.S. Pat. No. 5,149,427 to Brown discloses a cap for filter underdrain blocks, wherein the cap has a porous body. The cap is installed on a filter block having a plurality of orifices in a top wall of the filter block for channeling fluids to and from an overlying filter media. The cap eliminates the need for a separate gravel support layer to be installed between the fine grain filter media and the underdrain blocks.

U.S. Pat. No. 5,269,920 to Brown discloses a cap for underdrains and gravity filters which has a top surface and a bottom surface with a plurality of tapered screen members defining slots in the top surface. The slots provide communication with a filter bed without passage of the fine grain filter media therethrough.

International Application WO 97/40907 discloses a system for supporting fluid-treatment media above a lower surface that reduces media clogging and head loss in granular fluid-treatment media systems by providing a layered porous plate. The porous plate can have multiple layers of fine sized and course sized pores. The system for supporting fluid-treatment media is securely anchored to the infrastructure of the underdrain.

It is an object of the present invention to provide a cap for underdrain blocks which support fine grain filter media without resulting in an excessive pressure drop.

SUMMARY OF THE INVENTION

The invention includes a filtration tank having a plurality of underdrain filter blocks positioned beneath a media bed filter. Porous plates, used to prevent flow of media into the underdrain filter blocks, are attached to the top surfaces of the filter blocks by a grid arrangement. The grid arrangement permits the employment of thin porous plates that would otherwise be thought to be too fragile for use with the underdrain filter blocks. The grid arrangement supports the porous plates against shearing forces applied to portions of the porous plates during backwashing and that would otherwise tear the porous plates, particularly in the areas of the porous plates around screws used to secure the plates to the underdrain filter blocks. The use of a combination of a grid arrangement and thin porous plates with underdrain filter blocks successfully prevents shearing or tearing of the plates even during the backwashing operation, and the use of thin porous plates permits the employment of finer pore sizes without clogging of the pores of the thin porous plates or other permeability loss. Thin plates have the advantage of being manufactured with greater control of the pore size to thereby achieve greater media retention properties and permitting use of very fine media such as garnet sand having a media size as small as 150 microns. Use of such fine media improves the efficiency and the effectiveness of the filtration tank in removing contaminants from the liquid flowing through the filtration tank.

BRIEF DESCRIPTION OF THE DRAWINGS

The accompanying drawings are illustrative of the preferred embodiment of this invention.

FIG. 3 is an enlarged view of a portion of the gravity filter shown in FIG. 1;

FIG. 4 is a perspective view of a filter underdrain block shown in FIG. 1;

FIG. 5 is an elevation view of the underdrain block shown in FIG. 4;

FIG. 6 is a cross section view taken along line 6—6 in FIG. 5;

DETAILED DESCRIPTION OF THE INVENTION

Figure 2:
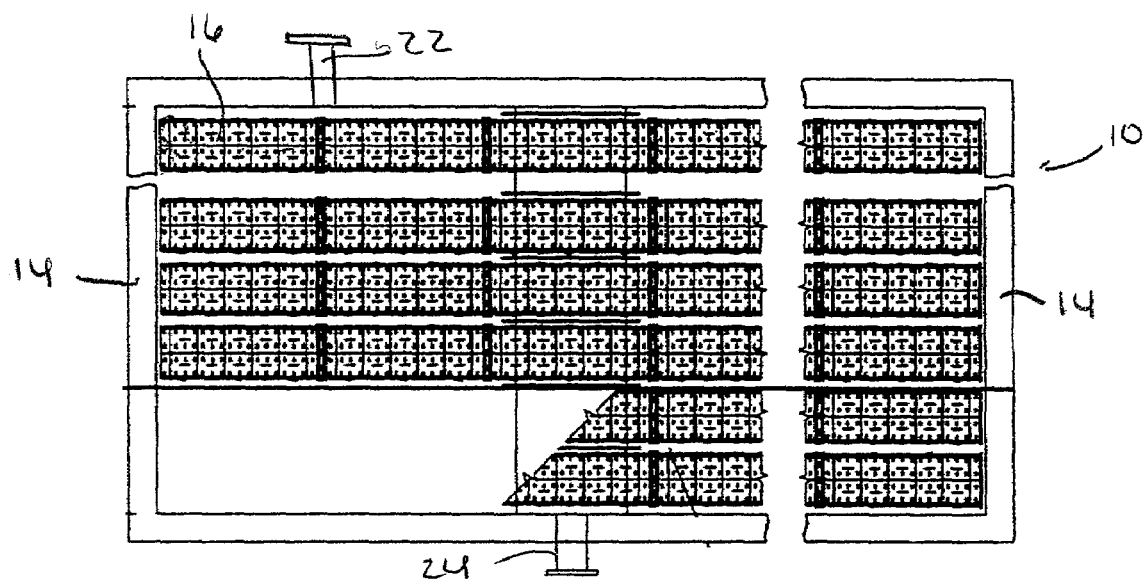
FIG. 2 is a plan view of the gravity filter shown in FIG. 1.
Figure 1:
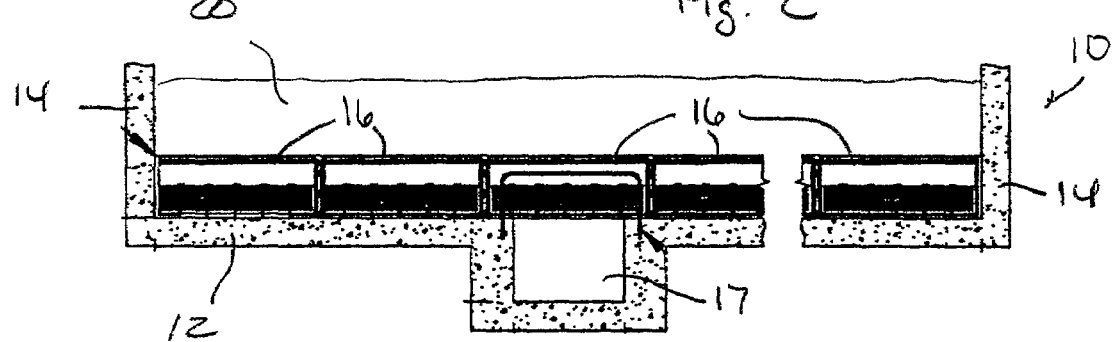
FIG. 1 is a sectional elevation view of a gravity filter embodying the present invention, including a plurality of filter underdrain blocks.

FIG. 1 illustrates a filtration tank 10 embodying the invention and which may be formed of concrete or other structural materials, such as metal. It will also be understood that although the tank, as shown, is rectangular in horizontal cross section, other shapes may be used. The filtration tank 10 includes a bottom wall 12 and two side walls 14. A plurality of underdrain blocks 16 are placed end-to-end in parallel rows across the bottom wall 12. As best shown in FIG. 4, filter media retaining caps 70 are disposed on underdrain blocks 16 to support a filter bed 20 (FIG. 1). Filter bed 20 is typically comprised of several layers of filter media. The choice of filter media to be used in the filter bed is dependent on the type of liquid to be filtered and the degree of filtration desired. Some typical filter media include, but are not limited to: granular activated carbon, anthracite, coal, magnesium oxide, ilmenite and sand, including garnet, silica, and quartz. The filter bed of a preferred embodiment of the invention comprises at least one layer of garnet with a particle size of approximately 180 microns.

Fluid inlet 22 directs fluids into the filtration tank and fluid outlet 24 directs filtrate away from filtration tank 10. Fluid inlet 22 may be an open pipe discharging onto the top of filter bed 20. Additionally, fluid outlet 24 may serve as a gas and/or fluid inlet for backwashing. The term gas as used herein is defined as air or other gases suitable for backwashing filter bed 20. The term fluid as used herein is defined as water or other liquids suitable for filtering or backwashing filter bed 20.

FIGS. 4–6 show a modular underdrain block 16 with bottom wall 26, top wall 28 and two side walls 30. Modular underdrain blocks 16 are shown as rectangular, although it is understood that they may be constructed in any shape that is convenient for installation. Inclined wall surfaces 32 separate primary conduit 40 and secondary conduits 42. Primary conduit 40 serves to channel filtrate to the fluid exit and away from filter unit 10. Secondary conduits 42 serve as equalization chambers during filtration and backwash. Orifices 34 (FIG. 4) through inclined wall 32 provide fluid communication between the primary conduit 40 and the secondary conduits 42. Orifices 36 (FIG. 6) through top wall 28 provide fluid communication between secondary conduits 42 and filter media retaining cap 70. Orifices 36 serve to receive effluent from filter bed 20 when filtration tank 10 is operating in the downflow mode. Orifices 36 also serve to discharge gas and/or liquid backwash into filter bed 20 when filtration tank 10 is operating in an upflow mode. During backwash, liquid and contaminants are typically drawn from the top of filtration tank 10 via a spillway (not shown).

Modular underdrain blocks 16 are typically installed on the floor of the filter bed. They may be placed end-to-end in parallel adjacent rows, also called laterals, which are connected to a flume 17. The modular underdrain blocks may first be connected to one another and then cemented or grouted in place. The connection may be a simple butt placement or a snap-fit closure. In one embodiment of the invention, the underdrain block has a male connector 62 (FIG. 5) and a female connector 64 on either end of the underdrain block. Male connector 62 may have a protrusion or wedge 66 sized and shaped to be inserted into hole 68 on female connector 64. In one embodiment, the male connector 62 of one underdrain block is placed adjacent to the female connector 64 of another underdrain block. A clamping tool, not shown, is placed on both underdrain blocks in such a way as to pull the underdrain blocks 16 together so that the protrusion 66 on the male connector 62 removably slides into the hole 68 in the female connector 64. Cement may also be used to secure the modular underdrain blocks to the floor as well as to one another.

The construction embodying the invention further includes a filter media retaining cap 70 fixed to the underdrain blocks 16 and used to prevent filter media from penetrating and clogging the underdrain blocks. The filter media retaining cap 70 typically is comprised of a plate of porous material having pores sized to support the filter media particles with little or no media penetration into the underdrain blocks 16, but also provide for fluid flow through the retaining cap. While the pore size may be smaller than the particular media size, in one preferred form of the invention, the pore size is somewhat larger than the particular media size. A bridging effect by the media prevents the smaller particles from entering the pores of the media retaining cap 70. For example, the media retaining cap 70 may have a pore size of 250 microns and support a garnet sand media having a typical particle size of 180 microns. In other constructions, the media retaining cap 70 includes pores having an average pore size of 200 microns or less. In still other constructions, the average pore size can be less than 50 microns. The pores within the media retaining cap may be configured in a variety of shapes and directions and may be multi-directional. In a preferred construction, at least 70% of the pores are multidirectional.

The filter media retaining cap 70 includes a bottom surface 44 a top surface 46. Media retaining cap 70 is disposed on the underdrain block 16 so its bottom surface 44 is supported by top wall 28.

The filter media retaining cap 70 is comprised of porous, planar body or plate, sized and shaped to cover the top surface 28 of one or more underdrain blocks 16. In a preferred embodiment, media retaining cap 70 has a width and length which corresponds to the width and length of the underdrain block 16. Media retaining cap 70 has a thickness of approximately less than one inch, preferably one half inch and most preferably one quarter inch. The porous media retaining cap 70 is constructed from a material having a pore size of approximately 250 microns or less. Media retaining cap 70 may be formed of ceramics; metals, in particular sintered metals such as nickel, titanium, stainless steel; and polymers, such as high density polyethylene, polypropylene or styrene. In one preferred embodiment, the porous media retaining cap 70 is molded from sintered plastic beads, as may be obtained from Porex® Technologies of Atlanta, Ga., and Porvair plc of Wrexham, U.K.

Figure 7:
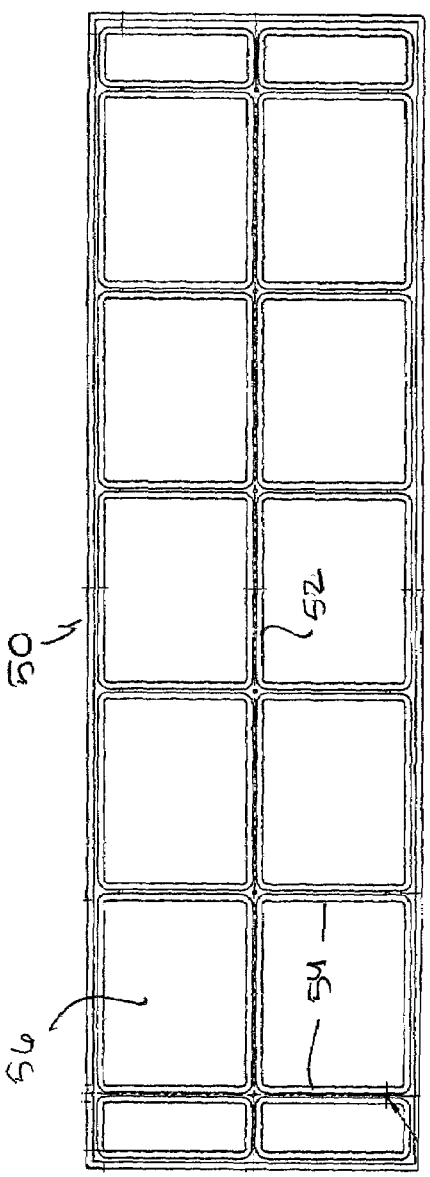
FIG. 7 is a cross section taken along line 7—7 in FIG. 6.
Figure 8:
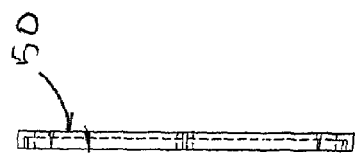
FIG. 8 is an end view of the hold down grid shown in FIG. 7.

In a preferred form of the invention, the filter media retaining cap 70 is also supported by a hold down grid 50 having longitudinal bar 52 and transverse bars 54 defining orifices 56. Hold down grid 50 is disposed on filter media retaining cap 70, and screws 58 can extend through orifices to secure hold down grid 50 and the filter media retaining cap 70 to underdrain block 16. The use of the hold down grid 50 allows for the use of a thinner filter media retaining cap 70, thereby reducing the pressure drop of the flow passing through the filter media retaining cap 70. The hold down grid 50 illustrated in FIG. 7 is one of many possible hold down grids. For example, additional longitudinal bars 52 or transverse bars 54 could be used to further increase the strength of the hold down grid 50. Additional bars 52, 54 allow for a further reduction in the thickness of the filter media retaining cap 70. However, the addition of longitudinal bars 52 and transverse bars 54 reduces the overall flow area and can reduce the flow capacity of the underdrain block 16. Therefore, a person having ordinary skill in the art must weigh the benefit of a thickness reduction of the filter media retaining cap 70 versus the potential reduced flow capacity into the underdrain block 16 when choosing a configuration for the hold down grid 50.

Although the invention has been described in detail with reference to certain preferred embodiments, variations and modifications exist within the scope and spirit of the invention as described and defined in the following claims.

What is claimed is:

1. A filtration tank including a chamber for holding liquid to be filtered, the filtration tank comprising:
   a fluid inlet for providing liquid to the chamber;
   a fluid outlet;
   at least one filter block disposed between the inlet and the outlet, wherein said at least one filter block includes a porous cap consisting of a single plate having an average pore size of up to about 250 microns throughout the thickness of the plate; and
   a filter media between the fluid inlet and the fluid outlet, the filter media filtering liquid flowing from the fluid inlet to the fluid outlet, the filter media being above and at least partially supported by the porous cap.

2. The filtration tank of claim 1, wherein a plurality of porous caps are disposed adjacent to one another.

3. The filtration tank of claim 2, wherein the porous caps are in direct contact, to form a continuous surface.

4. The filtration tank of claim 1, wherein the average pore size of the porous cap is less than about 200 microns.

5. The filtration tank of claim 1, wherein the average pore size of the porous cap is less than about 150 microns.

6. The filtration tank of claim 1, wherein the average pore size of the porous cap is less than about 100 microns.

7. The filtration tank of claim 1, wherein the average pore size of the porous cap is less than about 50 microns.

8. The filtration tank of claim 1, wherein the porous cap includes pores which are multi-directional.

9. The filtration tank of claim 8, wherein at least 70% of the pores are multi-directional.

10. The filtration tank of claim 1, wherein the porous cap has a thickness of less than 1 inch.

11. The filtration tank of claim 1, wherein the porous cap has a thickness of less than about ½ inch.

12. The filtration tank of claim 1, wherein the porous cap has a thickness of less than about ¼ inch.

13. The filtration tank of claim 1, wherein the porous cap supports a filter media with an average particle size greater than about 250 microns.

14. The filtration tank of claim 1, wherein the porous plate supports a filter media with an average particle size less than about 250 microns.

15. The filtration tank of claim 1, wherein the filter blocks are connected to one another with a snap-fit connection.

16. The filtration tank of claim 1, further comprising a flume disposed between the inlet and the outlet for receiving filtrate and backwash.

17. The filtration tank of claim 1, further comprising a hold down grid positioned above the porous cap.

18. A filtration tank, comprising:
    a fluid inlet;
    a fluid outlet;
    a flume disposed therebetween;
    a plurality of filter blocks in fluid communication with the flume, the filter blocks each including a top surface;
    a porous cap disposed on the top surface of at least one of the filter blocks, the porous cap consisting of a single plate having pores having an average pore size of up to about 250 microns throughout the thickness of the cap;
    a hold down grid positioned above the porous cap for holding the porous cap on the top surface; and
    a filter media disposed above the hold down grid and at least partially supported by the porous cap.

19. The filtration tank of claim 18, wherein the hold down grid further comprises at least one orifice in communication with the pores in the porous plate.

20. The filtration tank of claim 18, wherein the average pore size of the porous cap is less than about 200 microns.

21. The filtration tank of claim 18, wherein the average pore size of the porous cap is less than about 150 microns.

22. The filtration tank of claim 18, wherein the average pore size of the porous cap is less than about 100 microns.

23. The filtration tank of claim 18, wherein the average pore size of the porous cap is less than about 50 microns.

24. The filtration tank of claim 18, wherein the porous cap includes pores which are multi-directional.

25. The filtration tank of claim 18, wherein the porous cap has a thickness of less than 1 inch.

26. The filtration tank of claim 18, wherein the porous cap has a thickness of less than about ½ inch.

27. The filtration tank of claim 18, wherein the porous cap has a thickness of less than about ¼ inch.

28. A filtration media support for supporting a filter media in a filter tank assembly comprising:
    a plurality of filter blocks disposed in a filter tank; and
    a cap disposed above each of the filter blocks, the cap consisting of a single porous plate having an average pore size of about 250 microns or less throughout the thickness of the plate, the cap at least partially supporting the filtration media; and a support grid disposed above the cap and attached to the filter block.

29. The filtration media support of claim 28, wherein the support grid comprises at least one longitudinal bar and at least one transverse bar.

30. The filtration media support of claim 28, wherein the average pore size of the porous cap is less than about 200 microns.

31. The filtration media support of claim 28, wherein the average pore size of the porous cap is less than about 150 microns.

32. The filtration media support of claim 28, wherein the average pore size of the porous cap is less than about 100 microns.

33. The filtration media support of claim 28, wherein the average pore size of the porous cap is less than about 50 microns.

34. The filtration media support of claim 28, wherein the porous cap includes pores which are multi-directional.

35. The filtration media support of claim 28, wherein the porous cap has a thickness of less than 1 inch.

36. The filtration media support of claim 28, wherein the porous cap has a thickness of less than about ½ inch.

37. The filtration media support of claim 28, wherein the porous cap has a thickness of less than about ¼ inch.

* * * * *